(12) United States Patent
Unterer et al.

(10) Patent No.: US 10,733,707 B2
(45) Date of Patent: Aug. 4, 2020

(54) METHOD FOR DETERMINING THE POSITIONS OF A PLURALITY OF OBJECTS IN A DIGITAL IMAGE

(71) Applicant: QIAGEN GMBH, Hilden (DE)

(72) Inventors: Thomas Unterer, Lachen (CH); Guido Schuster, Stäfa (CH); Maiko Lohel, Hilden (DE); Björn Labitzke, Cologne (DE); Thorsten Zerfass, Mülheim an der Ruhr (DE)

(73) Assignee: QIAGEN GmbH, Hilden (DE)

( * ) Notice: Subject to any disclaimer, the term of this patent is extended or adjusted under 35 U.S.C. 154(b) by 84 days.

(21) Appl. No.: 16/060,887

(22) PCT Filed: Dec. 9, 2016

(86) PCT No.: PCT/EP2016/080501
§ 371 (c)(1),
(2) Date: Jun. 8, 2018

(87) PCT Pub. No.: WO2017/098007
PCT Pub. Date: Jun. 15, 2017

(65) Prior Publication Data
US 2019/0012770 A1    Jan. 10, 2019

(30) Foreign Application Priority Data

Dec. 10, 2015    (EP) .................................... 15199406

(51) Int. Cl.
*G06K 9/00*    (2006.01)
*G06T 5/00*    (2006.01)
(Continued)

(52) U.S. Cl.
CPC ............ *G06T 5/002* (2013.01); *G06T 3/4007* (2013.01); *G06T 3/4023* (2013.01);
(Continued)

(58) Field of Classification Search
None
See application file for complete search history.

(56) References Cited

U.S. PATENT DOCUMENTS

2010/0323350 A1    12/2010    Gordon et al.

FOREIGN PATENT DOCUMENTS

| WO | WO 2008/097455 A1 | 8/2008 |
| WO | WO 2009/117119 A1 | 9/2009 |
| WO | WO 2014/020137 A1 | 2/2014 |

OTHER PUBLICATIONS

International Search Report and Written Opinion of the International Searching Authority directed to related International Patent Application No. PCT/EP2016/080501, dated Mar. 12, 2012; 10 pages.

(Continued)

*Primary Examiner* — Soo Jin Park
(74) *Attorney, Agent, or Firm* — Sterne, Kessler, Goldstein & Fox P.L.L.C.

(57) ABSTRACT

The present invention relates to a method and a system for determining the positions of a plurality of objects in a digital image by discriminating true positive positions of the plurality of objects from false positive candidate positions of the plurality of objects. In particular, the invention relates to a method for determining the positions of a plurality of objects in a digital image by discriminating true positive positions of the plurality of objects from false positive candidate positions of the plurality of objects, the plurality of objects being configured to receive molecules comprising genetic information.

20 Claims, 4 Drawing Sheets

(51) Int. Cl.
 G06T 7/00 (2017.01)
 G06T 7/11 (2017.01)
 G06T 7/136 (2017.01)
 G06T 7/44 (2017.01)
 G06T 7/70 (2017.01)
 G06T 3/40 (2006.01)
(52) U.S. Cl.
 CPC .............. *G06T 7/0012* (2013.01); *G06T 7/11* (2017.01); *G06T 7/136* (2017.01); *G06T 7/44* (2017.01); *G06T 7/70* (2017.01); *G06T 2207/10064* (2013.01); *G06T 2207/20021* (2013.01); *G06T 2207/20032* (2013.01); *G06T 2207/30072* (2013.01)

(56) References Cited

OTHER PUBLICATIONS

International Preliminary Report on Patentability directed to related International Patent Application No. PCT/EP2016/080501, dated Jun. 12, 2018; 7 pages.

"Dynabeads Magnetic Separation Technology," ThennoFisher Scientific; 2 pages.

Kothe et al.: "SimpleSTORM: a fast. self-calibrating reconstruction algorithm for localization microscopyn," Histochemistry and Cell Biology, Apr. 11, 2014, vol. 141, No. 6, pp. 613-627.

Metzker, "Sequencing technologies—the next generation," Nature Reviews Genetics, Jan. 2010, vol. 11, pp. 31-46.

Pratt, "Image Enhancement," Digital Image Processing: PIKS Inside, John Wiley & Sons, Jan. 1, 2001, 3rd Edition, pp. 243-296.

Rees et al., "Elements of image processing in localization microscopy," Journal of Optics, Institute of Physics Publishing, Sep. 10, 2013, vol. 15, No. 9; 7 pages.

Ruusuvuori et al., "Evaluation of methods for detection of fluorescence labeled subcellular objects in microscope images," BMC BioInformatics, Biomed Central, May 13, 2010, vol. 11, No. 1 ; 17 pages.

Sahoo et al., "A Survey of Thresholding Techniques," Computer Vision, Graphics, and Image Processing, Feb. 1, 1988, vol. 41, No. 2, pp. 233-260.

Sezgin et al., "Survey over image thresholding techniques and quantitative performance evaluation," Journal of Electronic Imaging, Society of Photographic Instrumentation Engineers, Jan. 1, 2004, vol. 13, No. 1, pp. 146-168.

Smal et al., "Quantitative Comparison of Spot Detection Methods in Fluorescence Microscopyn," IEEE Transactions of Medical Imaging, Feb. 1, 2010, Vol, 1, No. 2, pp. 282-301.

Tian et al., "Algorithms for Subpixel Registration," Computer Vision, Graphics, and Image Processing, Aug. 1986, vol. 35, No. 2, pp. 220-223.

Voelkerding et al., Next-Generation Sequencing: From Basic Research to Diagnostics, Clinical Chemistry, Mar. 2009, Vol, 55, No, 4, pp. 641-658.

METHOD FOR DETERMINING THE POSITIONS OF A PLURALITY OF OBJECTS IN A DIGITAL IMAGE

The present invention relates to a method and a system for determining the positions of a plurality of objects in a digital image. The present invention particularly relates to a method and a system for determining the positions of the plurality of objects in a digital image by discriminating true positive positions from false positive candidate positions of the plurality of objects.

Biotechnology, medicine and related technical fields are based on the analysis of molecules. Electronic devices can analyse molecules with high precision and specificity. Especially in the last years, automated electronic devices have been developed for analysing large numbers of samples by routine methods. For example, modern DNA sequencing apparatus are used for routine analysis of large numbers of DNA probes. Protein samples can be analysed by high throughput screening and related methods. Frequently, such electronic devices detect fluorescent signals emitted from the sample probes. This is possible when molecules, such as nucleic acids or proteins, have been labelled with fluorescent compounds such as dyes.

Commercially available sequencing apparatus are capable of sequencing large numbers of samples labelled with fluorescent dyes in parallel. Recently developed methods, referred to as "next-generation sequencing", NGS, have revolutionized sequencing. NGS allows the massively parallel sequencing of clonally amplified or single DNA molecules that are spatially separated in a flow cell or by generation of an oil-water emulsion. NGS allows thousands or even millions to billions of sequencing reactions to be performed simultaneously.

In NGS, sequencing is performed by repeated cycles of polymerase-mediated nucleotide extensions or, in one format, by iterative cycles of oligonucleotide ligation. As a massively parallel process, NGS generates hundreds of megabases to gigabases of nucleotide-sequence output in a single instrument run, depending on the platform. The inexpensive production of large volumes of sequence data is the primary advantage over conventional methods.

NGS platforms and common applications/fields for NGS technologies are e.g. reviewed in Voelkerding et al, Clinical Chemistry 55:4 641-658, 2009 and Metzker, Nature Reviews/Genetics Volume 11, January 2010, pages 31-46.

In NGS, various oligonucleotides of interest are covalently attached to a support. Subsequently, a nucleotide labelled with a fluorescent dye is attached to the growing oligonucleotide chain with DNA polymerase. When the four nucleotides are labelled with different fluorescent dyes, fluorescent signals emitted from a probe can be detected and the type of nucleotide attached to the oligonucleotide can be identified. After detection, the fluorescent dye is cleaved off and the next synthesis cycle is carried out, in which a new labelled nucleotide is attached to the growing chain. By carrying out multiple cycles, the sequence of a growing oligonucleotide chain can be determined in a stepwise manner. The working steps are carried out in an automated sequencing apparatus.

US 2010/0323350 A1 and WO 2009/117119 A1 relate to methods and compositions for determining the identity of nucleic acids in nucleotide sequences using, for example, data obtained from sequencing by synthesis methods.

WO 2008/097455 A1 relates to an imaging system for exciting and measuring fluorescence on or in samples comprising fluorescent materials, e.g. fluorescent labels, dyes or pigments, in particular to detect fluorescent labels on nucleic acid. Moreover, a device is disclosed being configured such that fluorescent labels in a plurality of different DNA templates are simultaneously detected.

WO 2014/020137 A1 relates to a method for enriching target sequences from a sequencing library to provide a target enriched sequencing library, wherein the sequencing library is suitable for massive parallel sequencing and comprises a plurality of double-stranded nucleic acid molecules.

Fluorescent signals emitted from sample probes with labelled molecules are weak, but the signals have to be detected with high precision and specificity. Thus, precise optical equipment, especially cameras and scanning technology, is required for such processes.

In addition, extensive evaluation of the digital images captured by an optical imaging system of the sequencing apparatus is necessary for obtaining a precise and reliable result of the sequencing, e.g. in FASTQ.

A typical white-light image of a part of the flow cell of a sequencing apparatus comprises pixels that represent either background or beads. For the sequencing task in a sequencing apparatus it is important to read out and analyze the measured intensities of the beads. Therefore, it is necessary to determine pixels of interest, which refer to bead-positions.

The accuracy of the bead-detection process must be as robust and as reliable as possible in order to ensure the correct functioning of the subsequent processing steps in the gene sequencing, e.g. the determination whether the bead received genetic information or not. Therefore, it is necessary that only true positive bead-positions are considered and false positive positions are ignored. Since the accuracy of the detection process largely depends on the presence of noise and/or artifacts in the white-light image, the respective method for discriminating true positive bead-positions from false positive bead-positions must be especially capable to handle these objects.

It is an object of the invention to provide a method and a system for determining the positions of a plurality of objects in a digital image, particularly a method and a system for determining the positions of the plurality of objects in a digital image by discriminating true positive positions from false positive candidate positions of the plurality of objects. The method according to the present invention is computer-implemented. However, it is understood by the skilled person that there are also other ways of implementing the method according to the present invention.

This object is achieved by a method and a system according to the independent claims. Dependent patent claims refer to preferred embodiments.

The present invention relates to a method for determining the positions of a plurality of objects in a digital image by discriminating true positive candidate positions of the plurality of objects from false positive positions of the plurality of objects. The plurality of objects is configured to receive molecules comprising genetic information. The method comprises the step of determining a plurality of pixels in the digital image, each pixel having a local maximum intensity value with respect to the intensity values of a plurality of neighboring pixels of the respective pixels. The method further comprises the step of determining the variance of the intensity value of each pixel having a local maximum intensity value with respect to the intensity value of the respective pixel having a local maximum intensity value and the intensity value of each of the plurality of the respective neighboring pixels. The method further comprises the step of weighting the intensity value of each of the plurality of pixels having a local maximum intensity value by the respective determined variance of the intensity value. The method further comprises the step of creating a histogram comprising the respective weighted intensity of each pixel of the plurality of pixels each having a local maximum intensity value. The method further comprises the step of determining a plurality of local minimums and the global maximum of the histogram. The method further comprises the step of selecting one of the plurality of local minimums as a threshold value for discriminating true positive positions of the plurality of objects from false candidate positive positions of the plurality of objects, wherein the one local minimum is selected under consideration of the position of the selected local minimum of the histogram relative to the position of the global maximum. The method further comprises the step of using the threshold value for discriminating the true positive positions of the plurality of objects from false-positive candidate positions of the plurality of objects:

Preferably, the method according to the present invention further comprises the step of determining the sub-pixel position of each object of the plurality of objects. In other words, after the pixels which correspond to the true positive positions of the plurality of objects are determined, the true positive positions of the plurality of objects are determined on a sub-pixel scale. Preferably, the true positive positions of the plurality of objects are determined by parabola fitting of the determined pixels as well as the corresponding neighboring pixels which correspond to the true positive positions of the plurality of objects. An example of parabola fitting can be found in reference [1].

Preferably, the above discussed steps of the method according to the present invention are executed in the order as presented above.

Preferably, the plurality of neighboring pixels consists of the direct neighbors of the respective pixel having a local maximum value with respect to the intensity values of the plurality of neighboring pixels.

Preferably, the plurality of neighboring pixels comprises the direct neighbors of the respective pixel having a local maximum value with respect to the intensity values of the plurality of neighboring pixels.

Preferably, the method according to the present invention further comprises between the step of weighting the intensity value of each of the plurality of pixels having a local maximum intensity value and the step of creating a histogram comprising the respective weighted intensity of each pixel of the plurality of pixels each having a local maximum intensity value the following step: discarding or clamping the weighted pixels having a weighted intensity value above a first threshold $t\_w1$ or below a second threshold $t\_w2$.

Preferably, the method according to the present invention further comprises between the step of weighting the intensity value of each of the plurality of pixels having a local maximum intensity value and the step of creating a histogram comprising the respective weighted intensity of each pixel of the plurality of pixels each having a local maximum intensity value and more preferably after the step of discarding or clamping the weighted pixels the following step: scaling the weighted pixels with a logarithmic scale.

Preferably, the at least one object is a bead preferably being configured to receive DNA and/or RNA.

Preferably, the method according to the present invention comprises the step of removing and/or clamping at least one pixel of the digital image having an intensity below a first threshold $t\_e1$ or above a second threshold $t\_e2$ before the step of determining a plurality of pixels in the digital image, each pixel having a local maximum intensity value with respect to the intensity values of a plurality of neighboring pixels of the respective pixels.

Preferably, the method according to the present invention comprises the step of removing uneven illumination in the digital image. Preferably, the step of removing uneven illumination in the digital image is performed before the step of determining a plurality of pixels in the digital image, each pixel having a local maximum intensity value with respect to the intensity values of a plurality of neighboring pixels of the respective pixels and more preferably after the step of removing and/or clamping at least one pixel of the digital image having an intensity below a first threshold $t\_e1$ or above a second threshold $t\_e2$.

Preferably, the step of removing uneven illumination in a digital image comprises at least one of the following steps, preferably in the following order:

applying a low pass filter to a copy of the digital image;
dividing the digital image by the low pass filtered copy of the digital image;
dividing the digital image into a plurality of N tiles;
determining a first threshold intensity value $tlo\_n$ and a second threshold intensity value $thi\_n$ with $1 \leq n \leq N$ for each tile of the plurality of N tiles with $thi\_n > tlo\_n$;
creating a first matrix $m\_1$ comprising the first threshold intensity values $tlo\_n$ for the N tiles and creating a second matrix $m\_2$ comprising the second threshold intensity values thin for the N tiles;
applying a median filter to the first matrix $m\_1$ and applying a median filter to the second matrix $m\_2$:
upscaling the first matrix $m\_1$ to a matrix $m\_1'$ and unsealing the second matrix $m\_2$ to a matrix $m\_2'$, both matrixes $m\_1'$ and $m\_2'$ having the original size of the digital image; and
normalizing each intensity value of each pixel of the digital image under consideration of the corresponding value of the first matrix $m\_1'$ and of the corresponding value of the second matrix $m\_2'$.

Preferably, the low pass filter applied to the copy of the digital image is a Gaussian filter. Preferably, each tile of the N tiles has the same length $l\_1$ in a first direction and the same length $l\_2$ in a second direction being perpendicular to the first direction. Preferably, $l\_1 = l\_2$. Preferably, $l\_1 = l\_2 = 64$ pixels. Preferably, the size of the first matrix $m\_1$ and the second matrix $m\_2$ is 52×39. Preferably, the size of the digital image is 3296×2472. Preferably, the step of upscaling first matrix $m\_1$ to a matrix $m\_1'$ and upscaling the second matrix $m\_2$ to a matrix $m\_2'$ is performed using bicubic interpolation.

Preferably, the method according to the present invention further comprises the following step after the step of upscaling the first matrix $m\_1$ to a matrix my and upscaling the second matrix $m\_2$ to a matrix $m\_2'$ and before step of normalizing each intensity value of each pixel of the digital image: applying a low pass filter to the first matrix $m\_1$ and applying a low pass filter to the second matrix $m\_2$. Preferably, the low pass filter is a Gaussian.

Preferably, the step of normalizing each intensity value of each pixel of the digital image is performed by a linear transformation.

Preferably, the linear transformation can be calculated as follows:

$$\hat{v}(x, y) = \frac{v(x, y) - m\_1'(x, y)}{m\_2'(x, y) - m\_1'(x, y)}$$

wherein v̂(x,y) is the normalized intensity value of the respective pixel of the digital image, v(x,y) is the intensity value of the not normalized pixel of the digital image, m_1'(x,y) is the corresponding value of the upscaled first matrix m_1' and m_2'(x,y) is the corresponding value of the upscaled second matrix m_2'.

The present invention also relates to a computer program product comprising one or more computer readable media having computer executable instructions for performing the steps of the method of one of the aforementioned methods.

The present invention also relates to a system for determining the positions of a plurality of objects in a digital image by discriminating true positive positions of the plurality of objects from false positive positions of the plurality of objects.

Preferably, the plurality of objects is being configured to receive molecules comprising genetic information.

Preferably, the system is configured to carry out the steps of any of the methods according to any of the preceding claims.

The system according to the present invention comprises a first unit configured to determine a plurality of pixels in the digital image, each pixel having a local maximum intensity value with respect to the intensity values of a plurality of neighboring pixels of the respective pixels.

The system according to the present invention further comprises a second unit configured to determine the variance of the intensity value of each pixel having a local maximum intensity value with respect to the intensity value of the respective pixel having a local maximum intensity value and the intensity value of each of the plurality of the respective neighboring pixels.

The system further comprises a third unit configured to weight the intensity value of each of the plurality of pixels having a local maximum intensity value by the respective determined variance of the intensity value.

The system further comprises a fourth unit configured to create a histogram comprising the respective weighted intensity of each pixel of the plurality of pixels each having a local maximum intensity value.

The system further comprises a fifth unit configured to determine a plurality of local minimums and the global maximum of the histogram.

The system further comprises a sixth unit configured to select one of the local minimums as a threshold value for discriminating true positive positions of the plurality of objects from false positive positions of the plurality of objects, wherein the one local minimum is selected under consideration of the position of the selected local minimum of the histogram relative to the position of the global maximum.

The system further comprises an eighth unit configured to use the threshold value for discriminating the true positive positions of the plurality of objects from false-positive candidate positions of the plurality of objects Preferably, the system comprises a unit being configured to remove uneven illumination.

Preferably, the unit being configured to remove uneven illumination comprises at least one of the following:
- a unit configured to apply a low pass filter to a copy of the digital image;
- a unit configured to divide the digital image by the low pass filtered copy of the digital image;
- a unit configured to divide the digital image into a plurality of N tiles;
- a unit configured to determine a first threshold intensity value tlo_n and a second threshold intensity value thi_n with 1≤n≤N for each tile of the plurality of N tiles with thi_n>tlo_n;
- a unit configured to create a first matrix m_1 comprising the first threshold intensity values t tlo_n for the N tiles and creating a second matrix m_2 comprising the second threshold intensity values thi_n for the N tiles;
- a unit configured to apply a median filter to the first matrix m_1 and to apply a median filter to the second matrix m_2;
- an unit configured to upscale the first matrix m_1 to a matrix m_1' and upscaling the second matrix m_2 to a matrix m_2', both matrixes m_1' and m_2' having the original size of the digital image; and
- a unit configured to normalize each intensity value of each pixel of the digital image under consideration of the corresponding value of the first matrix m_1' and of the corresponding value of the second matrix m_2'.

Preferably, the unit being configured to remove uneven illumination further comprises a unit being configured to apply a low pass filter to the first matrix m_1 and apply a low pass filter to the second matrix m_2. More preferably, the unit being configured to remove uneven illumination further comprises a unit being configured to apply a low pass filter to the first matrix m_1 and apply a low pass filter to the second matrix m_2 after a median filter has been applied to the first matrix m_1 and a median filter has been applied to the second matrix m_2.

The present invention will be explained in more detail in the following with reference to preferred exemplary embodiments and with reference to the attached drawings, in which.

Figure 1:
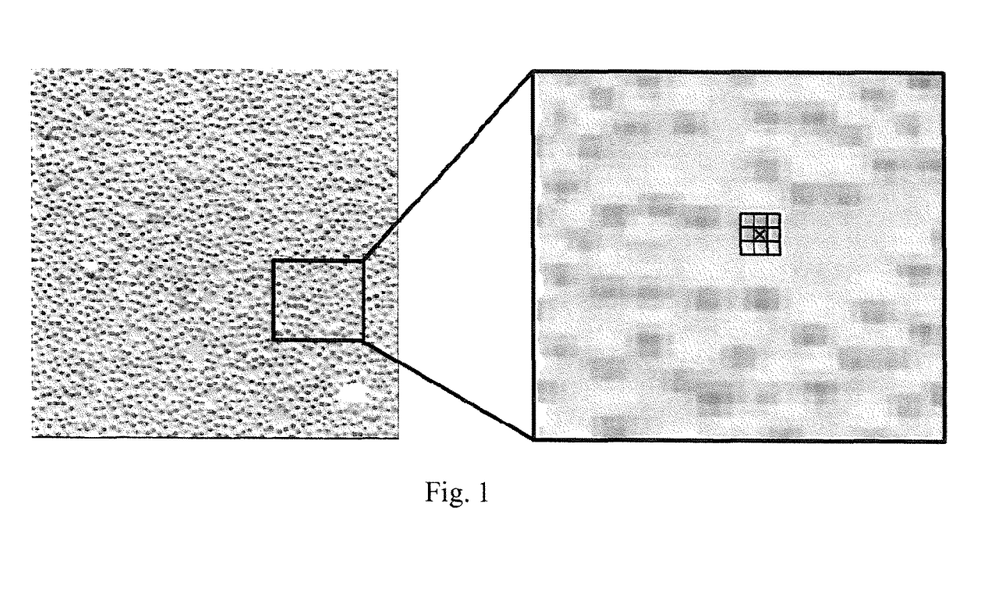
FIG. 1 shows an exemplary white-light image, an amplified section thereof as well as the determination of a pixel having a local maximum intensity value with respect to the intensity values of its directly neighboring pixels according to an embodiment of the present invention.

FIG. 1 shows on the left side an exemplary digital image representing a so-called white-light image, i.e. a digital image being obtained using an optical imaging system during reflective white-light illumination. For illustrative purposes, the exemplary digital image is color-inverted. The white light image comprises beads, i.e. objects which are configured to receive DNA or RNA on the surface. Such beads are for example commercially available e.g. from Thermo Fisher Scientific Inc., e.g. under the brand Dynabeads, see reference [2]. The white light image on the left side of FIG. 1 further comprises artifacts which have to be distinguished from the real beads as well as the real bead-positions. The right side of FIG. 1 shows an exemplary amplified section of the exemplary white-light image of the left side of FIG. 1. According to the present invention, a pixel of the white light image is chosen and it is determined whether this pixel has a local maximum intensity value with respect to the intensity values of its neighboring pixels. According to this preferred embodiment, only directly neighboring pixels are taken into consideration. However, it is understood by the skilled person, that also more neighboring pixels can be taken into consideration, e.g. not only the direct neighbors, i.e. the nearest neighbors, but e.g. also the next-nearest-neighbors. An exemplary pixel having a local maximum intensity value with respect to the intensity values of its neighboring pixels is shown on the right side of FIG. 1 in the amplified section. The pixel having a local maximum intensity value is marked with an "X" in a square of a 3×3 pattern and its neighboring pixels are in direct contact with said pixel in the pattern.

Every pixel of the white-light image is analyzed and it is determined whether the respective pixel has a local maximum intensity value with respect to the intensity values of its neighboring pixels. In this manner, a plurality of pixels, each pixel having a local maximum intensity value with respect to their respective neighboring pixels, are determined.

These pixels having a local maximum intensity value are candidates for possible bead-positions.

In a next step, the variance of the intensity value of each pixel having a local maximum intensity value with respect to the intensity value of the respective pixel having a local maximum intensity value and the intensity value of each of the plurality of the respective neighboring pixels is determined. For example, in the amplified section on the right side of FIG. 1, the variance of the intensity value having a local maximum intensity value with respect to the intensity value of each pixel in the 3×3 pattern is determined. This determination of the variance of the intensity value of the pixel having a local maximum intensity value is repeated for every pixel having local maximum intensity value.

One of the advantages of calculating the variance of the intensity value of the pixel having a local maximum intensity value as well as the variance of the intensity value of its neighboring pixels is that the variance of bead-pixels, i.e. the real bead-positions, is higher than the variance of local peaks in "empty", e.g. image regions which refer to false positive positions.

In a next step, the intensity value of each pixel having a local maximum intensity value is weighted by the respective determined variance of the intensity value of the respective pixel.

In other words, a variance-image is construed as a high-pass filter, where high-frequency elements, like the beads, pass and low-frequency structures are suppressed. Thus, only one scalar value per pixel, namely the weighted intensity value, is needed for further consideration.

In a next step, the weighted pixels having a weighted intensity value below a first threshold t_w1 or above a second threshold t_w2 are clamped. The limitation of the dynamic range by discarding the lower and upper bound results in a more stretched bi-modal histogram, which will be described below, since it ensures that outliers do not unnecessary compress the relevant data points into too few bins of the below-mentioned histogram. This stretching supports the robustness and reliability of the upcoming threshold determination process.

In a next step, the weighted pixels are scaled with a logarithmic scale. The logarithmic scaling further supports stretching of the two classes in the below-described bi-modal histogram.

In a next step, a histogram is created comprising the respective weighted intensity of each pixel of the plurality of pixels each having a local maximum intensity value. Thus, only one scalar value per pixel, namely the weighted intensity value, is put into the histogram.

In a next step, a plurality of local minimums and the global maximum of the histogram are determined.

In a next step, one of the local minimums is selected as a threshold value for discriminating true positive positions of the plurality of objects from false positive positions of the plurality of objects. The local minimum is selected under consideration of the position of the selected local minimum of the histogram relative to the position of the global maximum. In other words, the right or left minimum beside the global maximum is selected. If the global maximum is in the right part of the histogram, then the left minimum is searched. If the global maximum is in the left part of the histogram, then the right minimum is searched. One of the advantages of considering a bi-modal histogram is that two peak positions can be expected, which roughly represent the two underlying classes, i.e. the true positive positions and the false positive positions of the beads. Based on the maximum of the peak, it is decided in which direction the search of the closest minimum has to be applied. For instance, when the maximum peak corresponds to the true positive values, then the local minimum is searched on the left side and in case of a maximum that corresponds to false positive values the local minimum is searched on the right side. The differentiation if a maximum belongs to the false or the true positive class is based on the center position of the histogram, since false positive values, i.e. low discriminant values are typically located on the left part of the histogram and the true positive values, i.e. high discriminant values are located on the right part of the histogram.

In a next step, the pixels which correspond to the true positive positions of the plurality of objects are determined. This is performed using the threshold value for discriminating the true positive positions of the plurality of objects from false-positive candidate positions of the plurality of objects In other words, the value of the determined minimum is used as a threshold to discriminate true positive bead-positions from false-positive bead-positions.

Additionally, the bead-positions can be calculated on a sub-pixel scale, e.g. by parabola fitting. An example for a parabola fitting is given in reference [1].

Figure 2:
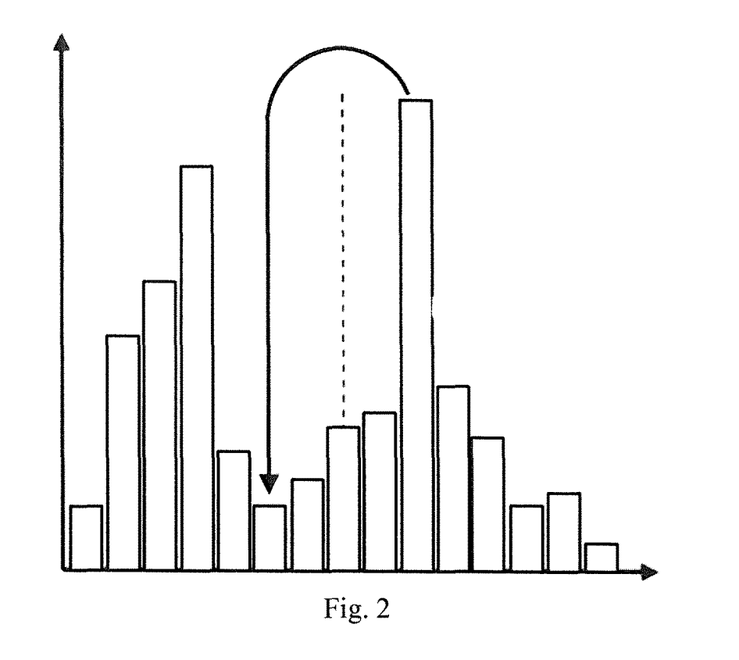
FIG. 2 shows an exemplary histogram according to a preferred embodiment of the invention.

A bi-modal histogram according to a preferred embodiment of the present invention is exemplarily shown in FIG. 2. In the histogram, the global maximum corresponds to true positive values and the local minimum is searched on the left side of said global maximum.

In case that during the capture of the white-light image an uneven illumination occurred, a pre-processing step before the aforementioned method for discriminating true positive positions from false positive positions is preferred.

Figure 3:
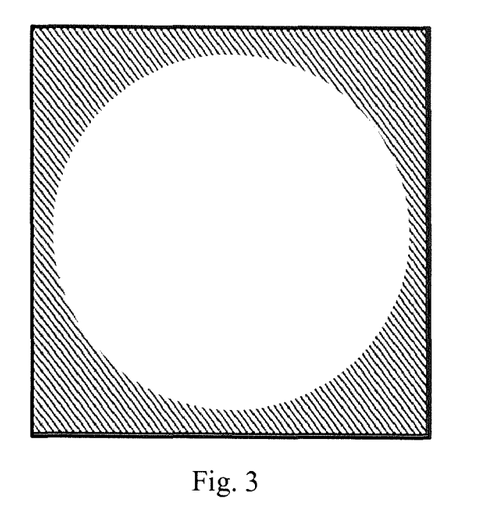
FIG. 3 shows an exemplary sketch of a white-light image having an uneven illumination caused by vignetting effect.

FIG. 3 shows an exemplary sketch of an uneven illumination caused by the so-called vignetting effect. The vignetting effect refers to a reduction of an image's brightness or saturation at the periphery compared to the image center. In FIG. 3, the area with reduced brightness is shown as a hatched area.

According to a preferred embodiment of the present invention, the following steps are performed for removing uneven illumination in the white-light image:

In a first step, a Gaussian filter is applied to a copy of the digital image. The Gaussian has preferably a very high Sigma. Then, the digital image is divided by its blurred, i.e. Gaussian-filtered, version. The Gaussian filter has the characteristic of a low pass filter, thus conserves low frequency elements of an image. Therefore, it is a feasible approximation of the illumination function, particularly when the filter uses a very high sigma.

Figure 4:
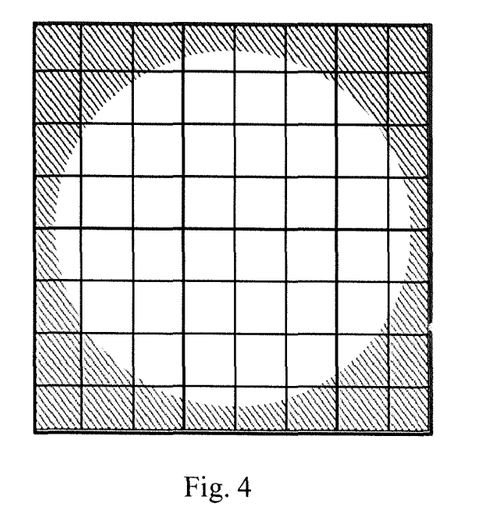
FIG. 4 shows an exemplary sketch of a division of a white-light image having an uneven illumination into a plurality of tiles according to an embodiment of the present invention.

In a next step, the digital image is divided into a plurality of N tiles. In other words, the resulting image is subdivided into several tiles. Such a division of the digital image having an uneven illumination is exemplarily shown in FIG. 4. One of the advantages of such a tile-approach is that low and high percentile values for distinct image regions can be determined more robustly. These values are required in a below-discussed step to normalize the contrast of the image.

In a next step, a first threshold intensity value tlo_n and a second threshold intensity value thi_n are determined with $1 \leq n \leq N$ for each tile of the plurality of N tiles and with thi_n>tlo_n. In other words, low and high percentile values are determined in local image-regions.

In a next step, a first matrix m_1 comprising the first threshold intensity values tlo_n for the N tiles is create and a second matrix m_2 comprising the second threshold intensity values thin for the N tiles is created.

In a next step, a median filter is applied to the first matrix m_1 and a median filter is applied to the second matrix m_2. One of the advantages of applying a median filter is that outliers are suppressed.

In a next step, a Gaussian filter is applied to the first matrix m_1 and a Gaussian filter is applied to the second matrix m_2. In other words, the surface of both matrices is smoothed. One of the advantages of smoothing the surfaces of the two matrices is that in the subsequent step of upscaling the matrices, discontinuities in the upscaled matrices are prevented or suppressed.

In a next step, the first matrix m_1 is upscaled to a matrix m_1' and the second matrix m_2 is upscaled to a matrix m_2'. After upscaling, both matrixes m_1' and m_2' have the original size of the digital image. One of the advantages of upscaling the two matrices is that for each bead-position or each possible bead-position a corresponding percentile value exists.

In a next step each intensity value of each pixel v(x,y) is normalized by a linear transformation using the following formula:

$$\hat{v}(x, y) = \frac{v(x, y) - m\_1'(x, y)}{m\_2'(x, y) - m\_1'(x, y)}$$

wherein $\hat{v}(x,y)$ is the normalized intensity value of the respective pixel of the digital image, v(x,y) is the intensity value of the not normalized pixel of the digital image, m_1'(x,y) is the corresponding value of the upscaled first matrix m_1' and m_2'(x,y) is the corresponding value of the upscaled second matrix m_2'. This normalization step transforms the intensities into an interval ranging from 0 to 1, i.e. [0,1].

Figure 5:
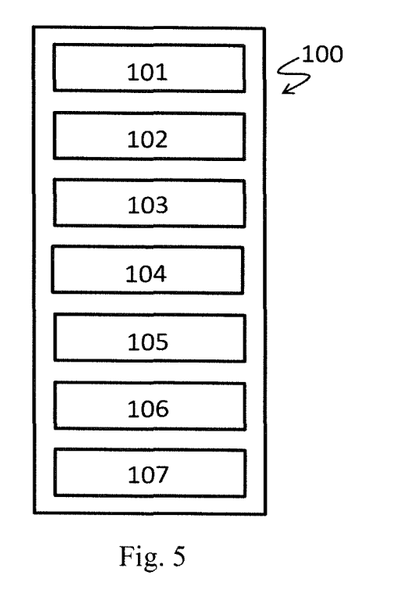
FIG. 5 shows an exemplary system according to a preferred embodiment of the present invention.

FIG. 5 shows an exemplary system 100 according to a preferred embodiment of the present invention.

In general, the system 100 is configured to carry out the method steps as discussed above.

The system 100 comprises a first unit 101 which determines a plurality of pixels in the digital image, each pixel having a local maximum intensity value with respect to the intensity values of a plurality of neighboring pixels of the respective pixels.

After the first unit 101 has determined that the plurality of pixels, a second unit 102 of the system 100 determines the variance of the intensity value of each pixel having a local maximum intensity value with respect to the intensity value of the respective pixel having a local maximum intensity value and the intensity value of each of the plurality of the respective neighboring pixels.

After the second unit 102 has determined the variance of the intensity value of each pixel having a local maximum intensity value A third unit 103 weights the intensity value of each of the plurality of pixels having a local maximum intensity value by the respective determined variance of the intensity value.

After the third unit 103 has weighted intensity values, a fourth unit 104 of the system 100 creates a histogram comprising the respective weighted intensity of each pixel of the plurality of pixels each having a local maximum intensity value.

Thereafter, a fifth unit 105 determines the local minimums and the global maximum of the histogram.

After the determination of the local minimums and the global maximum of the histogram, a sixth unit 106 selects one of the local minimums as a threshold value for discriminating true positive positions of the plurality of objects from false positive positions of the plurality of objects, wherein the one local minimum is selected under consideration of the position of the selected local minimum of the histogram relative to the position of the global maximum.

Thereafter, a seventh unit 107 determines the pixels which correspond to the true positive positions of the plurality of objects by applying the threshold value to the histogram.

Figure 6:
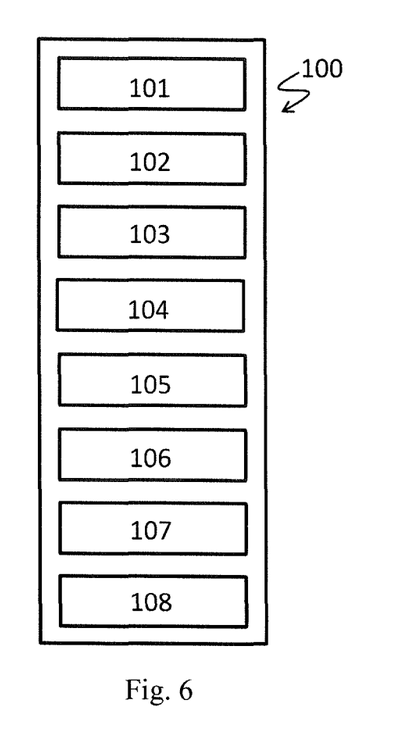
FIG. 6 shows an exemplary system according to another preferred embodiment of the present invention.

FIG. 6 shows an exemplary system 100 according to another preferred embodiment of the present invention.

The system 100 comprises the same units as the system 100 according to the preferred embodiment with reference to FIG. 5. In addition, the system 100 further comprises a unit 108 being configured to remove uneven illumination.

Figure 7:
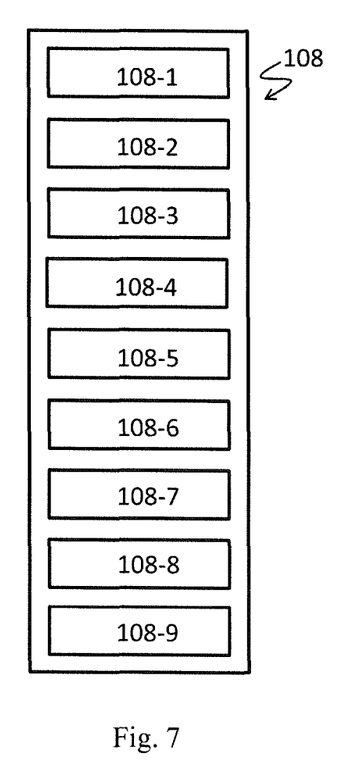
FIG. 7 shows a unit being configured to remove uneven illumination according to a preferred embodiment of the present invention.

FIG. 7 shows a unit 108 being configured to remove uneven illumination according to a preferred embodiment of the present invention.

In general, the unit 108 is configured to carry out the method steps of removing uneven illumination as discussed above.

The unit 108 comprises a first unit 108-1 which applies a low pass filter to a copy of the digital image. After applying the low pass filter, a second unit 108-2 of the system 100 divides the digital image by the low pass filtered copy of the digital image. Thereafter, a third unit 108-3 of the system 100 divides the digital image into a plurality of N tiles. After the division into a plurality of tiles, a fourth unit 108-4 of the system 100 determines a first threshold intensity value tlo_n and a second threshold intensity value thi_n with $1 \leq n \leq N$ for each tile of the plurality of N tiles with thi_n>tlo_n. Thereafter, a fifth unit 108-5 of the system 100 creates a first matrix m_1 comprising the first threshold intensity values tlo_n for the N tiles and creating a second matrix m_2 comprising the second threshold intensity values thi_n for the N tiles. After the creation of the matrices, a sixth unit 108-6 applies a median filter to the first matrix m_1 and to apply a median filter to the second matrix m_2. After the median filtering, a seventh unit 108-7 applies a Gaussian filter to the first matrix m_1 and applies a Gaussian filter to the second matrix m_2.

After Gaussian-filtering, an eighth unit 108-8 upscales the first matrix m_1 to a matrix m_1' and upscales the second matrix m_2 to a matrix m_2', both matrixes m_1' and m_2' having the original size of the digital image. After the upscaling, a ninth unit 108-9 normalizes each intensity value of each pixel of the digital image under consideration of the corresponding value of the first matrix m_1' and of the corresponding value of the second matrix m_2'.

While the invention has been illustrated and described in detail in the drawings and foregoing description, such illustration and description are to be considered illustrative or exemplary and non-restrictive; the invention is thus not limited to the disclosed embodiments. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality and may mean "at least one".

REFERENCES

[1] Tian, et al, "Algorithms for Subpixel Registration", Comput. Vision Graph. Image Process., August 1986, volume 35, number 2, pages 220-223;
[2]—https://www.thermofisher.com/de/de/home/brands/product-brandidynal.html

The invention claimed is:

1. A computer implemented method for determining positions of a plurality of objects in a digital image, the plurality of objects being configured to receive molecules comprising genetic information, the method comprising:
determining a plurality of pixels in the digital image, each pixel having a local maximum intensity value with respect to intensity values of a plurality of neighboring pixels of the respective pixel;
determining a variance of an intensity value of each pixel having a respective local maxim urn intensity value with respect to the intensity value of the respective pixel and the intensity value of each of the plurality of the respective neighboring pixels;
weighting the intensity value of each of the plurality of pixels having a respective local maximum intensity value by the respective determined variance of the intensity value;
creating a histogram comprising the respective weighted intensity of each pixel of the plurality of pixels each having a respective local maximum intensity value;
determining a plurality of local minimums and a global maximum of the histogram;
selecting a local minimum of the plurality of local minimums as a threshold value for discriminating true positive positions of the plurality of objects from false positive positions of the plurality of objects, wherein the local minimum is selected under consideration of a position of the selected local minimum of the histogram relative to a position of the global maximum; and
using the threshold value for discriminating the true positive positions of the plurality of objects from false-positive candidate positions of the plurality of objects.

2. The method according to claim 1, further comprising:
determining a sub-pixel position of each object by parabola fitting for the determined pixels.

3. The method according to claim 1, further comprising:
removing weighted pixels having a weighted intensity value below a first threshold or above a second threshold.

4. The method according to claim 1, further comprising:
scaling weighted pixels with a logarithmic scale.

5. The method according to claim 1, wherein at least one object of the plurality of objects is a bead configured to receive DNA or RNA.

6. The method according to claim 1, further comprising:
removing at least one pixel of the digital image having an intensity below a first threshold or above a second threshold.

7. The method according to claim 1, further comprising:
removing uneven illumination in the digital image.

8. The method according to claim 7, wherein the removing uneven illumination comprises:
applying a low pass filter to a copy of the digital image;
dividing the digital image by the low pass filtered copy of the digital image;
dividing the digital image into a plurality of N tiles;
determining a first threshold intensity value and a second threshold intensity value for each tile of the plurality of N tiles;
creating a first matrix comprising the first threshold intensity values for the N tiles, and a second matrix comprising the second threshold intensity values for the N tiles;
applying a median filter to the first matrix; and a median filter to the second matrix;
upscaling the first matrix and the second matrix, the upscaled first matrix and the upscaled second matrix having an original size of the digital image; and
normalizing each intensity value of each pixel of the digital image under consideration of the corresponding value of the upscaled first matrix and of the corresponding value of the upscaled second matrix.

9. The method according to claim 8, further comprising:
applying a low pass filter to the first matrix, and a low pass filter to the second matrix.

10. The method according to claim 8, wherein the upscaling is performed using bicubic interpolation.

11. The method according to claim 8, wherein the normalizing each intensity value of each pixel of the digital image is performed by a linear transformation.

12. A non-transitory computer readable media having instructions stored thereon that, when executed by at least one computing device, cause the at least one computing device to perform operations comprising:
determining a plurality of pixels in a digital image; each pixel having a local maximum intensity value with respect to intensity values of a plurality of neighboring pixels of the respective pixel;
determining a variance of an intensity value of each pixel having a respective local maximum intensity value with respect to the intensity value of the respective pixel and the intensity value of each of the plurality of the respective neighboring pixels;
weighting the intensity value of each of the plurality of pixels having a respective local maximum intensity value by the respective determined variance of the intensity value;
creating a histogram comprising the respective weighted intensity of each pixel of the plurality of pixels each having a respective local maximum intensity value;
determining a plurality of local minimums and a global maximum of the histogram;
selecting a local minimum of the plurality of local minimums as a threshold value for discriminating true positive positions of the plurality of objects from false positive positions of the plurality of objects, wherein the local minimum is selected under consideration of a position of the selected local minimum of the histogram relative to a position of the global maximum; and using the threshold value for discriminating the true positive positions of the plurality of objects from false-positive candidate positions of the plurality of objects.

13. The non-transitory computer readable media according to claim 12, wherein the operations further comprise:
removing uneven illumination in the digital image.

14. The non-transitory computer readable media according to claim 13, wherein the removing uneven illumination comprises:
applying a low pass filter to a copy of the digital image;
dividing the digital image by the low pass filtered copy of the digital image;
dividing the digital image into a plurality of N tiles;
determining a first threshold intensity value and a second threshold intensity value for each tile of the plurality of N tiles;
creating a first matrix comprising the first threshold intensity values for the N tiles, and a second matrix comprising the second threshold intensity values for the N tiles;
applying a median filter to the first matrix, and a median filter to the second matrix;
upscaling the first matrix the second matrix, the upscaled first matrix and the upscaled second matrix having an original size of the digital image; and
normalizing each intensity value of each pixel of the digital image under consideration of the corresponding value of the upscaled first matrix and of the corresponding value of the upscaled second matrix.

15. The non-transitory computer readable media according to claim 14, wherein the operations further comprise:
applying a low pass filter to the first matrix, and a low pass filter to the second matrix.

16. A system for determining positions of a plurality of objects in a digital image, the plurality of objects being configured to receive molecules comprising genetic information, wherein the system comprises:
a memory; and
at least one processor coupled to the memory and configured to:
determine a plurality of pixels in the digital image, each pixel having a local maximum intensity value with respect to intensity values of a plurality of neighboring pixels of the respective pixel;
determine a variance of an intensity value of each pixel having a respective local maximum intensity value with respect to the intensity value of the respective pixel and the intensity value of each of the plurality of the respective neighboring pixels;
weight the intensity value of each of the plurality of pixels having a respective local maximum intensity value by the respective determined variance of the intensity value;
create a histogram comprising the respective weighted intensity of each pixel of the plurality of pixels each having a respective local maximum intensity value;
determine a plurality of local minimums and a global maximum of the histogram;
select a local minimum of the local minimums as a threshold value for discriminating true positive positions of the plurality of objects from false positive positions of the plurality of objects, wherein the local minimum is selected under consideration of a position of the selected local minimum of the histogram relative to a position of the global maximum; and
determine the pixels which correspond to the true positive positions of the plurality of objects by applying the threshold value to the histogram.

17. The system according to claim 16, wherein the at least one processor is further configured to:
remove uneven illumination.

18. The system according to claim 17, wherein to remove uneven illumination the at least one processor is configured to:
apply a low pass filter to a copy of the digital image;
divide the digital image by the low pass filtered copy of the digital image;
divide the digital image into a plurality of N tiles;
determine a first threshold intensity value and a second threshold intensity value for each tile of the plurality of N tiles;
create a first matrix comprising the first threshold intensity values for the N tiles, and a second matrix comprising the second threshold intensity values for the N tiles;
apply a median filter to the first matrix, and apply a median filter to the second matrix;
upscale the first matrix and the second matrix, the upscaled first matrix and the upscaled second matrix having an original size of the digital image; and
normalize each intensity value of each pixel of the digital image under consideration of the corresponding value of the upscaled first matrix and of the corresponding value of the upscaled second matrix.

19. The system according to claim 18, wherein the at least one processor is further configured to:
apply a low pass filter to the first matrix, and a low pass filter to the second matrix.

20. The system according to claim 18, wherein to normalize each intensity value of each pixel of the digital image the at least one processor is configured to normalize each intensity value of each pixel of the digital image using a linear transformation.

* * * * *